United States Patent [19]
Null et al.

[11] Patent Number: 5,218,782
[45] Date of Patent: Jun. 15, 1993

[54] RECYCLING BENCH APPARATUS

[76] Inventors: Cecelia M. Null; Clinton D. Null, both of 5703 A Plum St., Shaw AFB, S.C. 29152

[21] Appl. No.: 791,384

[22] Filed: Nov. 14, 1991

[51] Int. Cl.⁵ .............................................. A01M 1/10
[52] U.S. Cl. ...................................... 43/124; 43/125; 43/120; 43/132.1; 220/908
[58] Field of Search ................. 43/120, 124, 125, 129, 43/132.1, 114; 220/908, 909

[56] References Cited

U.S. PATENT DOCUMENTS

| | | | |
|---|---|---|---|
| 1,323,918 | 12/1919 | Seraphine | 43/129 |
| 2,356,022 | 8/1944 | Wright | 43/120 |
| 2,721,099 | 10/1955 | Rupp | 43/125 |
| 3,488,879 | 1/1970 | Laughlin | 43/131 |
| 3,661,326 | 5/1972 | Wilson | 43/120 |

Primary Examiner—Kurt C. Rowan
Attorney, Agent, or Firm—Hugh E. Smith

[57] ABSTRACT

A recycling bench includes a rigid housing containing a plurality of aligned compartments in adjacency relative to one another utilizing a single lid overlying the compartments for positioning of various recycling components within each compartment. An alternative aspect of the invention includes individual lids and a pesticide fumigant to minimize insect infestation in the storage of various recycling components.

4 Claims, 5 Drawing Sheets

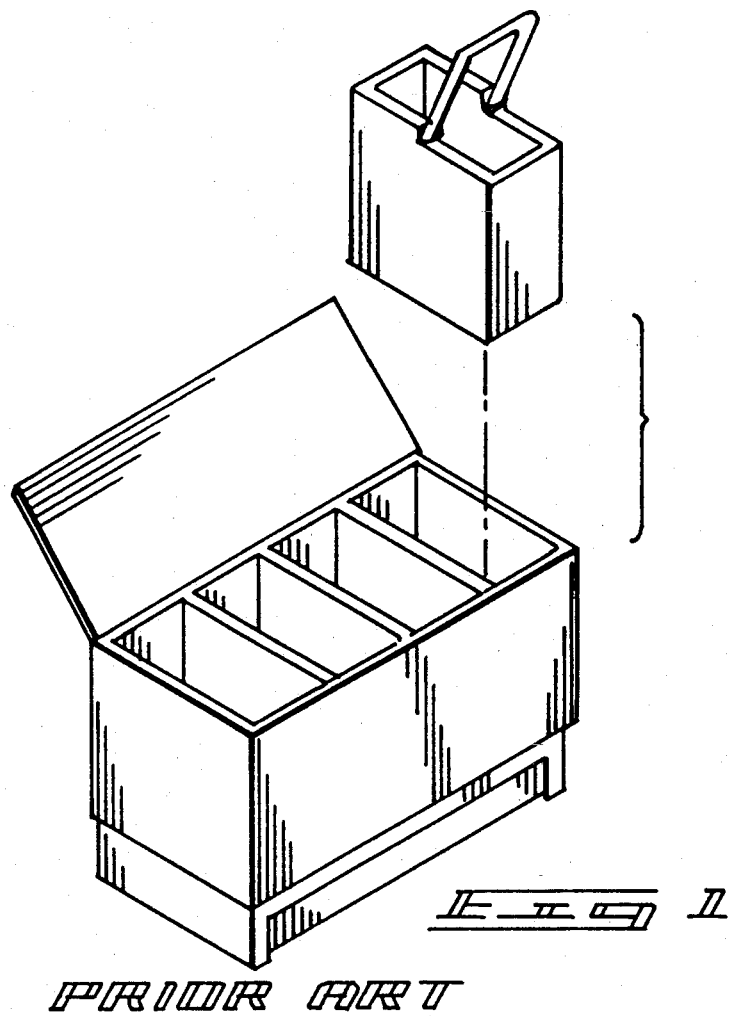
Fig 1
PRIOR ART
Fig 2
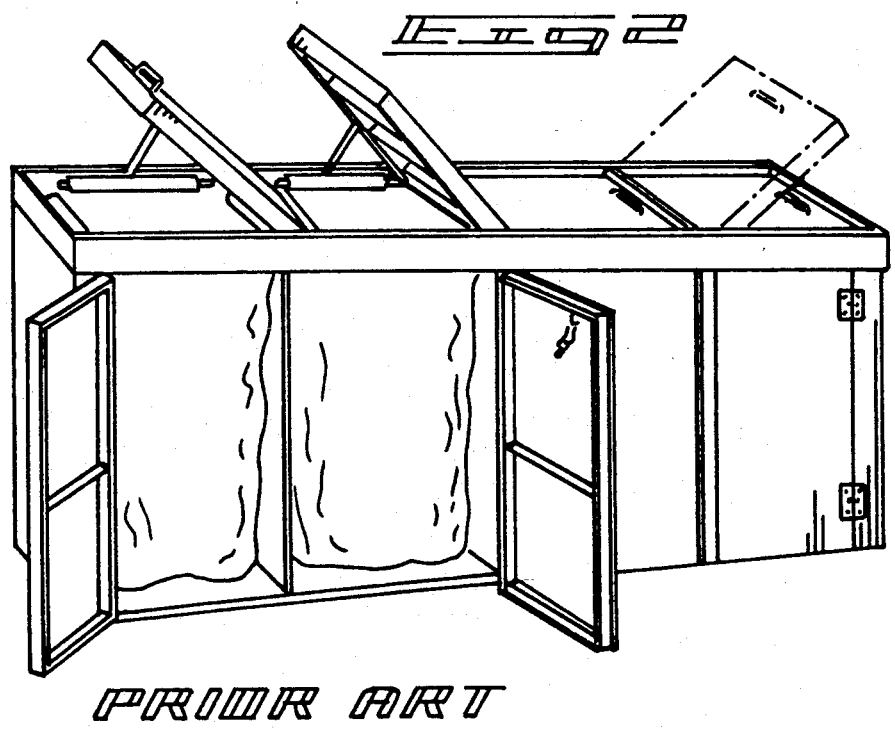
PRIOR ART

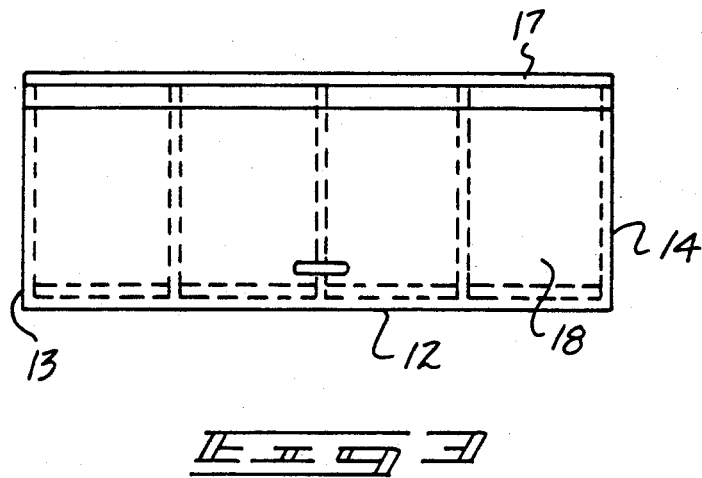
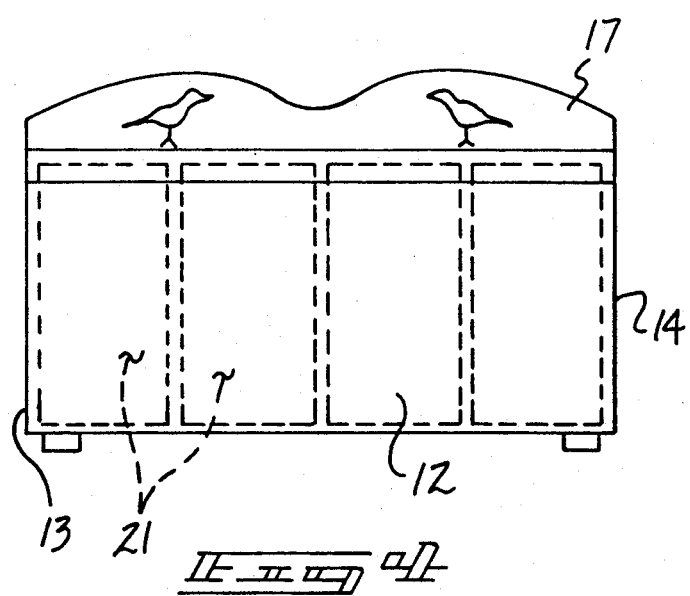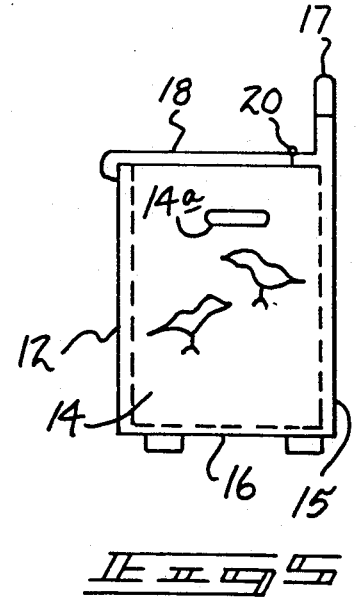

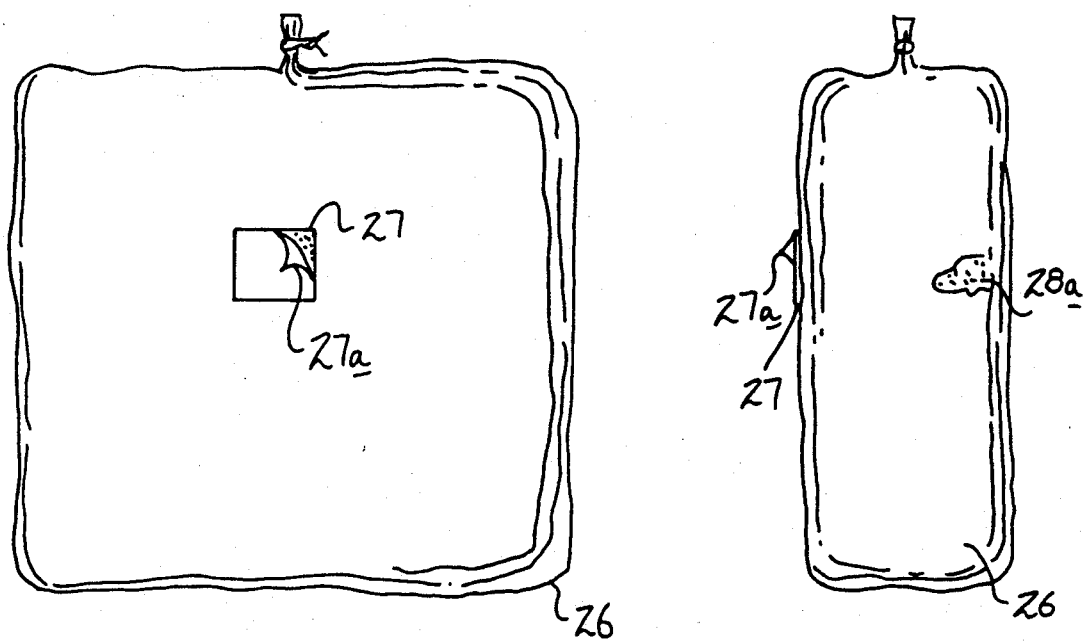
FIG 10        FIG 11
FIG 9
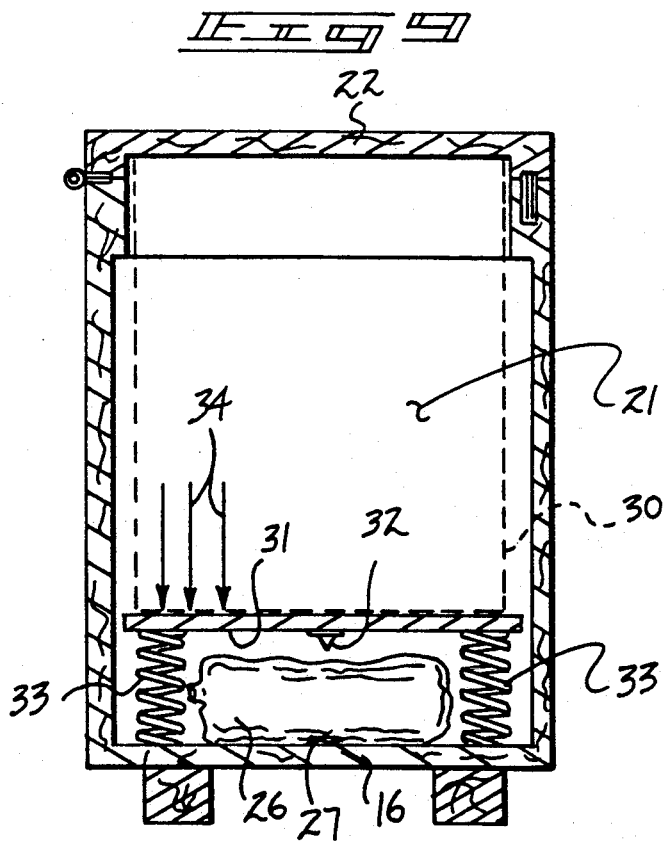

RECYCLING BENCH APPARATUS

BACKGROUND OF THE INVENTION

1. Field of the Invention

The field of invention relates to recycling apparatus, and more particularly pertains to a new and improved recycling bench apparatus wherein the same is directed to the recycling and segregation of various components for subsequent transport to a recycling center.

2. Description of the Prior Art

Storage bins of various types are utilized throughout the prior art for the positioning of various components within a recycling bench structure. Such apparatus is exemplified in U.S. Pat. No. 4,801,034 to Sandomeno wherein a recycling bin includes a divided compartment container utilizing a top shelf pivotally mounted to the container.

U.S. Pat. No. 3,893,615 to Johnson sets forth a multi-compartment recycling bin container organization.

U.S. Pat. No. 4,874,111 to Heller sets forth a multi-compartment refuse container utilizing a matrix of recycling compartments.

U.S. Pat. No. 3,720,346 to Cypher sets forth a cylindrical recycling compartment and container.

U.S. Pat. No. 4,821,903 to Hayes sets forth a trash bin and cart utilizing various bins arranged for transport on a cart structure.

As such, it may be appreciated that there continues to be a need for a new and improved recycling bench apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of recycling apparatus now present in the prior art, the present invention provides a recycling bench apparatus wherein the same utilizes a multi-compartmented recycling bench for the convenient storage of various recycling components. As such, the general purpose of the present invention, which will be described subsequently in greater detail, is to provide a new and improved recycling bench apparatus which has all the advantages of the prior art recycling apparatus and none of the disadvantages.

To attain this, the present invention provides a recycling bench including a rigid housing containing a plurality of aligned compartments in adjacency relative to one another utilizing a single lid overlying the compartments for positioning of various recycling components within each compartment. An alternative aspect of the invention includes individual lids and a pesticide fumigant to minimize insect infestation in the storage of various recycling components.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved recycling bench apparatus which has all the advantages of the prior art recycling apparatus and none of the disadvantages.

It is another object of the present invention to provide a new and improved recycling bench apparatus which may be easily and efficiently manufactured and marketed.

It is a further object of the present invention to provide a new and improved recycling bench apparatus which is of a durable and reliable construction.

An even further object of the present invention is to provide a new and improved recycling bench apparatus which is susceptible of a low cost of manufacture with regard to both materials and labor, and which accordingly is then susceptible of low prices of sale to the consuming public, thereby making such recycling bench apparatus economically available to the buying public.

Still yet another object of the present invention is to provide a new and improved recycling bench apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art recycling bin structure.

FIG. 2 is an isometric illustration of a further example of a prior art bin structure.

FIG. 3 is an orthographic top view of the instant invention.

FIG. 4 is an orthographic front view of the instant invention.

FIG. 5 is an orthographic end view of the instant invention.

FIG. 9 is an orthographic view, taken along the lines 9—9 of FIG. 8 in the direction indicated by the arrows.

FIG. 10 is an orthographic bottom view of a balloon member utilized in an inflated configuration by the invention.

FIG. 11 is an orthographic end view of the balloon member.

DESCRIPTION OF THE PREFERRED EMBODIMENT

Figure 6:
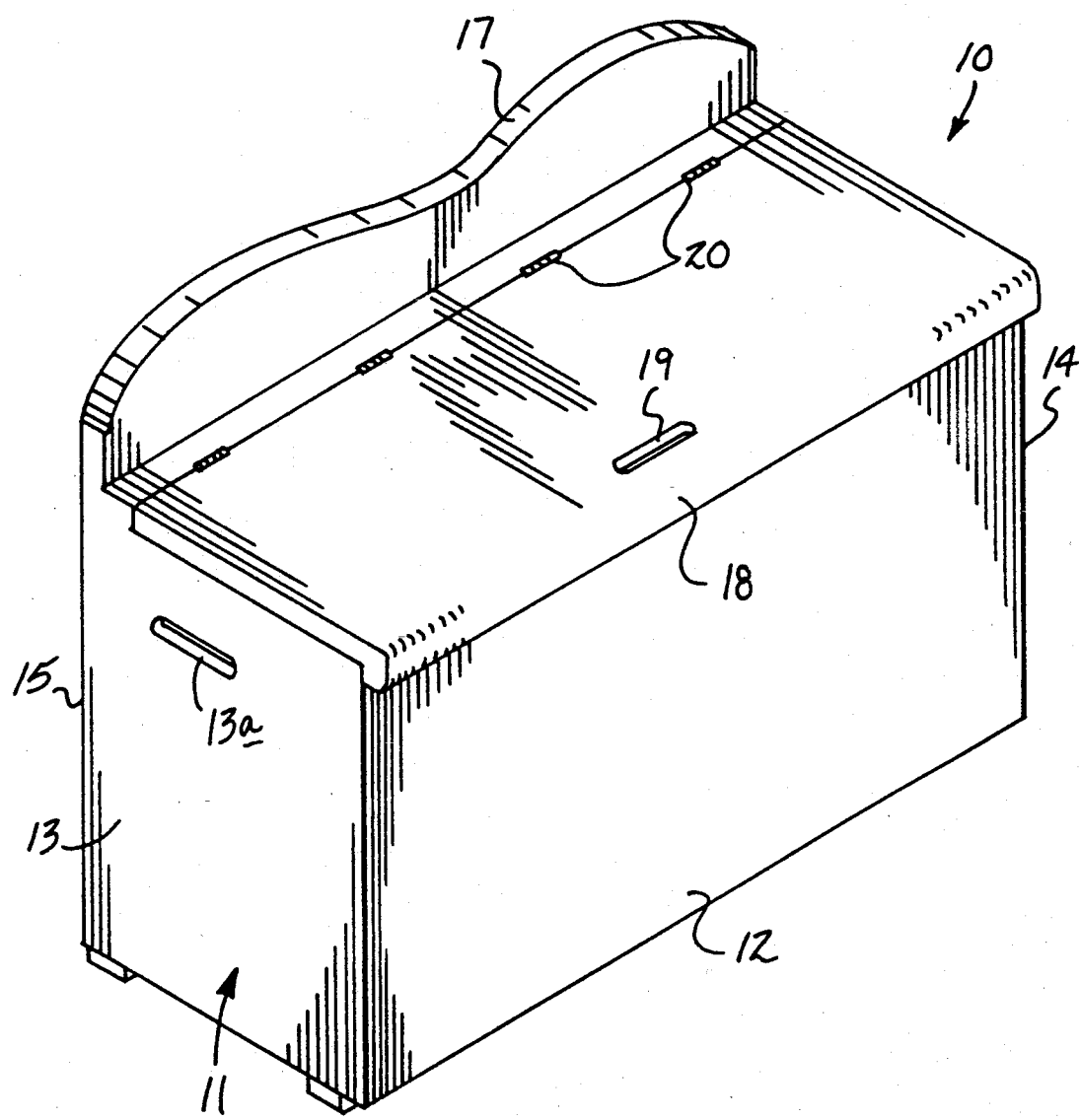
FIG. 6 is an isometric illustration of the instant invention.
Figure 8:
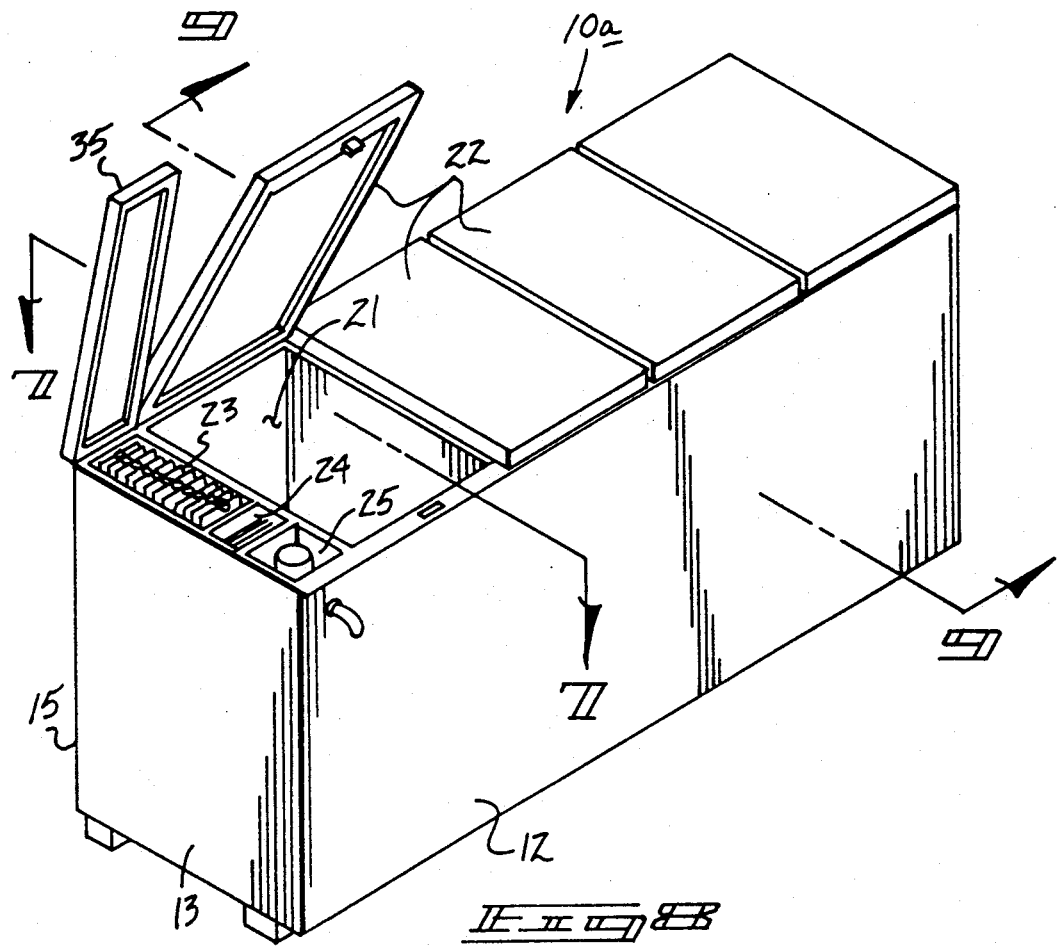
FIG. 8 is an isometric illustration of a modification of the invention.
Figure 7:
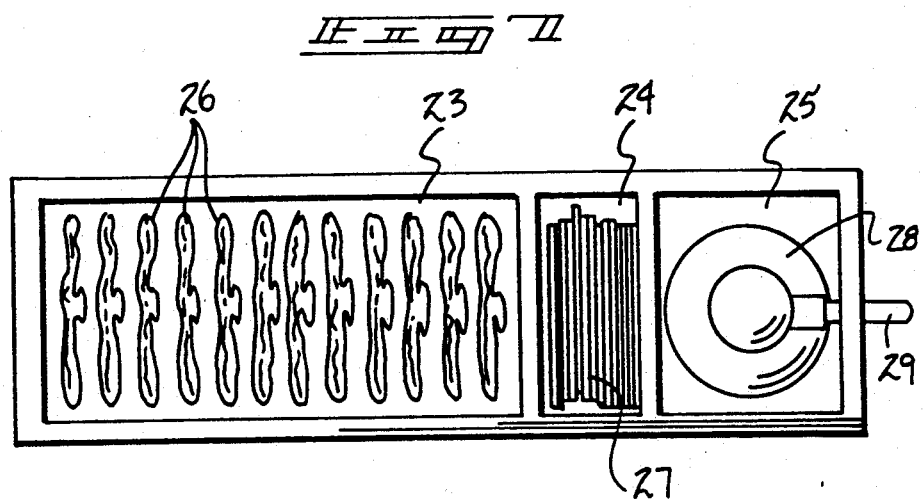
FIG. 7 is an orthographic view, taken along the lines 7—7 of FIG. 8 in the direction indicated by the arrows.

With reference now to the drawings, and in particular to FIGS. 1 to 11 thereof, a new and improved recycling bench apparatus embodying the principles and concepts of the present invention and generally designated by the reference numerals 10 and 10a will be described.

FIG. 1 illustrates a prior art multi-compartmented recycling structure as set forth in U.S. Pat. No. 4,801,034. The FIG. 2 illustrates a further prior art example as set forth in U.S. Pat. No. 3,893,615 of a multi-compartment recycling bench structure utilizing individual lids.

More specifically, the recycling bench apparatus 10 of the instant invention essentially comprises a housing 11, including a housing front wall 12 spaced from a housing rear wall 15. A first end wall 13 is spaced from and parallel a second end wall 14, with the end walls including respective first and second handle recesses 13a and 14a for transport of the organization and ease of manipulation thereof. A floor 16 is positioned below a lid 18 hingedly mounted to the top wall of the organization by the use of a plurality of hinges 20 spaced from a rear wall extension flange 17 providing a rear abutment for various components to be sorted about the bench top or top surfaces of the lid 18. A plurality of housing chambers 21 are defined in an aligned orientation within the housing 11, as illustrated in the FIGS. 3 and 4 for example.

The modification as set forth in the FIGS. 7-11 illustrates the chamber utilizing a housing chamber lid 22 overlying each housing chamber 21, with each lid hingedly mounted relative to the rear wall 15. A supply chamber lid 35 is positioned above a plurality of supply chambers defined by a respective first, second, and third supply chamber 23, 24, and 25 positioned below the supply chamber lid 35. It should be noted that each of the lids 35 and 22 are in a coplanar relationship relative to one another when the lids are in a lowered position for use as a bench top. The first chamber 23 includes a plurality of storage of balloon members 26 therewithin, wherein the second chamber 24 includes adhesive plates 27, with the third chamber utilizing a compressed gas canister 28 that includes a nozzle 29 projecting through the front wall 12. The compressed gas canister 28 includes a pesticide gas 28a to be imparted into a balloon member of the plurality of balloon members 26, in a manner as illustrated in the FIGS. 10 and 11. Subsequently, an adhesive plate 27 is removed from the second chamber 24, wherein a peel-away layer 27*a* is removed exposing an adhesive, wherein subsequently the pesticide filled balloon 26 is adhered to a top surface of the floor 16 below a chamber floor plate 31 that is removed permitting the positioning of the balloon, as illustrated. The chamber floor plate 31 is positioned and supported by spaced spring members 33 positioned on opposed sides of the balloon 26, and wherein the floor plate 31 is provided with a piercing spike 32 fixedly mounted medially to a bottom surface of the chamber floor plate 31 in confrontation with the balloon member 26. A bag member 30 positioned within a chamber 21, as illustrated in FIG. 9, is rested upon a top surface of the chamber floor plate 31, whereupon the arrows 34 indicate the chamber floor plate directed downwardly towards the floor 16 upon filling of the bag member. Subsequently, the bag member is ruptured by the piercing spike 32 upon filling of the bag member 30 with various recycling components, whereupon the pesticide gas 28 is released within the housing chamber 21 for exposure of the recycling components within the bag 30 to the pesticide gas to minimize infestation of insects within an associated chamber. It should be noted that each of the chambers 21 is thusly provided with the spring and floor plate construction, as illustrated in FIG. 9, illustrated by means of example and not limited to a single chamber.

In this manner, the contents within the chambers are maintained in a pesticide free manner to avoid infestation in a forum containing the apparatus 10*a*.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A recycling bench apparatus, comprising,
   - a housing, the housing including a front wall spaced from and parallel to a rear wall, and
   - a first end wall spaced from and parallel to a second end wall, and
   - a floor extending coextensively and orthogonally relative to the front wall, first end wall, second end wall, and rear wall, and
   - the housing including a plurality of aligned separate housing chambers coextensive relative to one another in adjacency in a longitudinally aligned relationship within the housing, and
   - means for partitioning the housing chambers relative to one another, and each chamber includes a lid pivotally mounted overlying each chamber, wherein the lid is hingedly mounted to the rear wall, and a supply chamber, the supply chamber including a supply chamber lid, the supply chamber lid including a top surface, and each housing chamber lid including a housing chamber lid top surface, wherein each housing chamber lid top surface and the chamber lid top surface are coplanar relative to one another when in a lowered position relative to the housing, and the supply chamber including a supply first chamber, a supply second chamber, and a supply third chamber, wherein the supply first chamber and supply second chamber include a first partition wall between the supply first chamber and the supply second chamber, and the supply second chamber and supply third chamber include a second partition wall dividing the supply second chamber from the supply third chamber, wherein the supply first chamber includes a plurality of balloon members contained therewithin, the supply second chamber includes a plurality of adhesive plates contained therewithin, and the supply third chamber includes a compressed gas canister including a pesticide gas contained therewithin.

2. An apparatus as set forth in claim 1 wherein the compressed gas canister includes a nozzle projecting through the front wall permitting ease of filling of a balloon member when mounted to the nozzle.

3. An apparatus as set forth in claim 2 wherein each chamber includes a chamber floor plate, the chamber floor plate including a plurality of spring members mounted between the chamber floor plate and the top surface of the chamber floor, and a pesticide gas filled balloon member is positioned between the housing floor and the chamber floor plate, and the chamber floor plate including a piercing spike mounted medially of a bottom surface of the chamber floor plate in confrontation with the balloon.

4. An apparatus as set forth in claim 3 wherein the pesticide gas filled balloon includes an adhesive plate from said plurality of adhesive plates secured to the balloon and the top surface of the housing floor to fixedly secure the balloon to the housing floor.

* * * * *